(12) United States Patent
Zhang et al.

(10) Patent No.: US 12,073,266 B2
(45) Date of Patent: *Aug. 27, 2024

(54) EVENT-DRIVEN SERVICE FOR CONFIGURABLE METRICS

(71) Applicant: SAP SE, Walldorf (DE)

(72) Inventors: Tao Zhang, Backnang (DE); Daniel Intoppa, Karlsruhe (DE); Ming Liu, Stuttgart (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,662

(22) Filed: Jun. 27, 2023

(65) Prior Publication Data

US 2023/0342229 A1    Oct. 26, 2023

Related U.S. Application Data

(63) Continuation of application No. 17/549,438, filed on Dec. 13, 2021, now Pat. No. 11,734,087.

(51) Int. Cl.
*G06F 9/54* (2006.01)
(52) U.S. Cl.
CPC .................... *G06F 9/542* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | |
|---|---|---|---|
| 10,210,038 B2* | 2/2019 | Sasturkar | G06F 11/3409 |
| 10,997,152 B2* | 5/2021 | Cseri | G06F 16/2358 |
| 11,294,972 B2* | 4/2022 | George | H04L 67/535 |
| 2023/0099557 A1* | 3/2023 | Thapliyal | G06F 3/0484 |
| | | | 715/733 |

* cited by examiner

*Primary Examiner* — Andy Ho
(74) *Attorney, Agent, or Firm* — Mintz Levin Cohn Ferris Glovsky and Popeo, P.C.

(57) ABSTRACT

A method may include defining a rule identifying an event that triggers a change in a value of a metric. The defining of the rule includes generating a subscription to receive the event from an event stream. Occurrences of the event identified by the rule may be detected based on receiving the event from the event stream. In response to each occurrence of the event, the value of the metric and/or the change in the value of the metric may be evaluated. A notification may be sent to a software application consuming the metric based on the value of the metric and/or the change in the value of the metric satisfying a threshold. Related systems and computer program products are also provided.

20 Claims, 11 Drawing Sheets

Metric

Vocabulary: Marketing Contact

- If Event [Product Review] is raised with
  - [Verified Customer] [is equal to] [true]
  - And [Product Rating] [is greater than] [4]
  - [Raise Score by] [3]

- If Event [Interaction Create] is raised with
  - [Type] [is equal to] [Sales Order]
  - And [Sales Volume] [is between ()] [50] [100]
  - [Set Score] [3]

- If Event [Interaction Create] is raised with
  - [Type] [is equal to] [Sales Order]
  - And [Sales Volume] [is greater than] [100]
  - [Set Score] [?]

- If Event [Product Review] [is raised with formula]
  - Product Rating * Service Rating / 2 > 5
  - [Raise Score by formula]
  - Product Rating * Service Rating / 2

Triggers

- If Score value [is between (..)] [3] [20]
  - [Sent Mail, Push Notification]
  - Check Trigger [in Realtime]

- If Score value [is between (..)] [20] [50]
  - [Sent Mail, Push Notification]
  - Check Trigger [every] [1] [Day]

- If Score value [is raised by (%)] [20%]
  - In the Last [3] [Weeks]
  - Then trigger [Sent Mail]
  - Check Trigger [every] [1] [Day]

FIG. 3B

EVENT-DRIVEN SERVICE FOR CONFIGURABLE METRICS

CROSS REFERENCE TO RELATED APPLICATIONS

This application is a continuation of application Ser. No. 17/549,438 filed Dec. 13, 2021, entitled "EVENT-DRIVEN SERVICE FOR CONFIGURABLE METRICS." The disclosure of which is incorporated herein by reference in its entirety.

TECHNICAL FIELD

The subject matter described herein relates generally to cloud native computing and more specifically to an event-driven service for configurable metrics.

BACKGROUND

An enterprise may rely on a suite of enterprise software applications for sourcing, procurement, supply chain management, invoicing, and payment. These enterprise software applications may provide a variety of data processing functionalities including, for example, billing, invoicing, procurement, payroll, time and attendance management, recruiting and onboarding, learning and development, performance and compensation, workforce planning, logistics, and/or the like. Examples of enterprise software applications may include enterprise resource planning (ERP) software, customer relationship management (CRM) software, and/or the like. Data associated with multiple enterprise software applications may be stored in a common database in order to enable integration across different enterprise software applications. Moreover, to provide access to multiple end users from different geographic locations, many enterprise software applications may be deployed as a web-based application (e.g., a software-as-a-service (SaaS)) such that the functionalities of the enterprise software applications are available for remote access.

SUMMARY

Systems, methods, and articles of manufacture, including computer program products, are provided for an event-driven service for configurable metrics. In some example embodiments, there is provided a system that includes at least one processor and at least one memory. The at least one memory may include program code that provides operations when executed by the at least one processor. The operations may include: defining, based at least on one or more user inputs, a first rule identifying a first event that triggers a change in a value of a first metric, the defining of the first rule includes generating a first subscription to receive the first event from an event stream; detecting, based at least on receiving the first event from the event stream, an occurrence of the first event identified by the first rule; in response to the occurrence of the first event, evaluating the value of the first metric and/or the change in the value of the first metric; and sending, to a software application consuming the first metric, a notification based at least on the value of the first metric and/or the change in the value of the first metric satisfying a threshold.

In some variations, one or more features disclosed herein including the following features can optionally be included in any feasible combination. The operations may further include: defining, based at least on the one or more user inputs, a second rule identifying a second event that triggers the change in the value of the first metric, the defining of the second rule includes generating a second subscription to receive the second event from the event stream; detecting, based at least on receiving the second event from the event stream, an occurrence of the second event identified by the second rule; and in response to the occurrence of the second event, evaluating the value of the first metric and/or the change in the value of the first metric.

In some variations, the one or more user inputs may specify a vocabulary associated with the software application consuming the first metric. The vocabulary may include a selection of events. The one or more user inputs may further select the first event from the selection of events.

In some variations, the vocabulary may further include a selection of attributes associated with a payload of the first event. The one or more user inputs may further select an attribute associated with the payload of the first event. The first rule may impose one or more conditions upon the selected attribute.

In some variations, the first rule may be defined based on a first building block including the first rule and a second building block including a second rule. The first building block may be associated with a first weight and the second building block is associated with a second weight. The first metric may be evaluated based at least on the first weight applied to a first value of the first building block and the second weight applied to a second value of the second building block.

In some variations, at least one of the first building block and the second building block may be associated with a second metric.

In some variations, the evaluating of the value of the first metric and/or the change in the value of the first metric may be triggered based on a schedule.

In some variations, the schedule may include real time triggers or periodic triggers for evaluating the value of the first metric and/or the change in the value of the first metric.

In some variations, the evaluating of the first metric may include aggregating a first plurality of changes in the value of the first metric over a first time period and aggregating a second plurality of changes in the value of the first metric over a second time period. The evaluating of the first metric may further include determining whether a difference between the first plurality of changes and the second plurality of changes satisfy a condition.

In some variations, the operations may further include: storing the value of the first metric and/or the change in the value of the first metric as time-series data in a database.

In some variations, the operations may further include: generating, for display at a client device, a data presentation providing a visual representation of the value of the first metric and/or the change in the value of the first metric.

In some variations, the software application may include an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

In another aspect, there is provided a method for an event-driven service for configurable metrics. The method may include: defining, based at least on one or more user inputs, a first rule identifying a first event that triggers a change in a value of a first metric, the defining of the first rule includes generating a first subscription to receive the first event from an event stream; detecting, based at least on receiving the first event from the event stream, an occurrence of the first event identified by the first rule; in response to the occurrence of the first event, evaluating the value of the first metric and/or the change in the value of the first metric; and sending, to a software application consuming the first metric, a notification based at least on the value of the first metric and/or the change in the value of the first metric satisfying a threshold.

In some variations, one or more features disclosed herein including the following features can optionally be included in any feasible combination. The method may further include: defining, based at least on the one or more user inputs, a second rule identifying a second event that triggers the change in the value of the first metric, the defining of the second rule includes generating a second subscription to receive the second event from the event stream; detecting, based at least on receiving the second event from the event stream, an occurrence of the second event identified by the second rule; and in response to the occurrence of the second event, evaluating the value of the first metric and/or the change in the value of the first metric.

In some variations, the one or more user inputs may specify a vocabulary associated with the software application consuming the first metric. The vocabulary may include a selection of events. The one or more user inputs may further select the first event from the selection of events. The vocabulary may further include a selection of attributes associated with a payload of the first event. The one or more user inputs may further select an attribute associated with the payload of the first event. The first rule may impose one or more conditions upon the selected attribute.

In some variations, the first rule may be defined based on a first building block including the first rule and a second building block including a second rule. The first building block may be associated with a first weight and the second building block is associated with a second weight. The first metric may be evaluated based at least on the first weight applied to a first value of the first building block and the second weight applied to a second value of the second building block.

In some variations, the evaluating of the value of the first metric and/or the change in the value of the first metric may be triggered based on a schedule. The schedule may include real time triggers or periodic triggers for evaluating the value of the first metric and/or the change in the value of the first metric.

In some variations, the evaluating of the first metric may include aggregating a first plurality of changes in the value of the first metric over a first time period and aggregating a second plurality of changes in the value of the first metric over a second time period. The evaluating of the first metric may further include determining whether a difference between the first plurality of changes and the second plurality of changes satisfy a condition.

In some variations, the method may further include: generating, for display at a client device, a data presentation providing a visual representation of the value of the first metric and/or the change in the value of the first metric In another aspect, there is provided a computer program product including a non-transitory computer readable medium storing instructions. The instructions may cause operations may executed by at least one data processor. The operations may include: defining, based at least on one or more user inputs, a first rule identifying a first event that triggers a change in a value of a first metric, the defining of the first rule includes generating a first subscription to receive the first event from an event stream; detecting, based at least on receiving the first event from the event stream, an occurrence of the first event identified by the first rule; in response to the occurrence of the first event, evaluating the value of the first metric and/or the change in the value of the first metric; and sending, to a software application consuming the first metric, a notification based at least on the value of the first metric and/or the change in the value of the first metric satisfying a threshold.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes with respect to enterprise software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3B depicts another example of a user interface for configuring a metric, in accordance with some example embodiments;

DETAILED DESCRIPTION

Enterprise software applications may provide a variety of solutions for sourcing, procurement, supply chain management, invoicing, and payment. An enterprise software application may consume various metrics in order to perform data processing functionalities such as billing, invoicing, procurement, payroll, time and attendance management, recruiting and onboarding, learning and development, performance and compensation, workforce planning, and logistics. The enterprise software application may also monitor one or more metrics in order to detect actionable changes in the state of the enterprise software application and/or the state of the computing infrastructure associated with the enterprise software application. For example, one or more metrics computed based on transactional data associated with the enterprise software application may be indicative of the behavior and/or performance of the enterprise software application. However, conventional metric services are configured to provide, on-demand, high level metrics that encapsulate large volumes of data. Not only are conventional metric services unable to provide explainable metrics in real time, aggregation and processing of large volumes of data may consume significant computational resources and slow performance.

In some example embodiments, a metrics engine may be configured to provide an event-driven metrics service. For example, the metrics engine may be configured to apply one or more rules identifying one or events that trigger changes in a metric. Upon each occurrence of the one or more events, the metrics engine may compute a corresponding change in the value of the metric. Moreover, the metrics engine may persist, as time series data, the changes in the value of the metric associated with each individual occurrence of the one or more events. In doing so, the metrics engine may enable a software application consuming the metric to monitor the metric in real time.

Although the software application may still request the values of the metric from the metrics engine, the one or more rules applied by the metrics engine may be further defined to include follow-up actions, which may be performed automatically when, for example, the value of the metric and/or the changes in the value of the metric satisfy a threshold. Persisting the changes in the value of the metric as time-series data may also enhance the explainability and traceability of the metric on a granular level (e.g., at an event level to enable a correlation between event, time, and magnitude of change). It should be appreciated that the event-driven nature of the metrics engine may obviate the aggregation and processing of large volumes of data, thus reducing the consumption of computational resources and improving performance.

Figure 1:
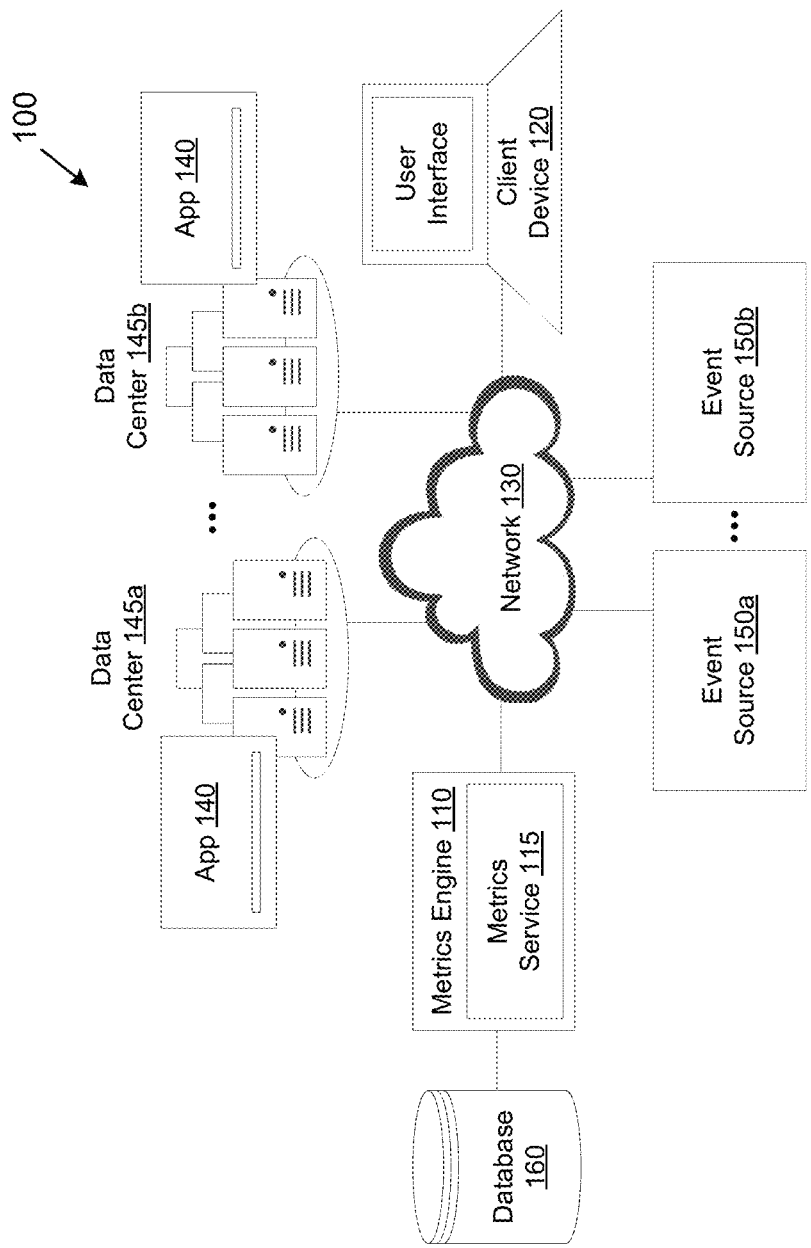
FIG. 1 depicts a system diagram illustrating an example of a cloud computing system, in accordance with some example embodiments.

FIG. 1 depicts a system diagram illustrating an example of a cloud computing system 100, in accordance with some example embodiments. Referring to FIG. 1, the cloud computing system 100 may include a metrics engine 110 and a client device 120, which are communicatively coupled via a network 130. The client device 120 may be a processor-based device including, for example, a smartphone, a tablet computer, a wearable apparatus, a virtual assistant, an Internet-of-Things (IoT) appliance, and/or the like. The network 130 may be a wired network and/or a wireless network including, for example, a wide area network (WAN), a local area network (LAN), a virtual local area network (VLAN), a public land mobile network (PLMN), the Internet, and/or the like.

In some example embodiments, the metrics engine 110 may provide one or more metrics service 115 configured to support the definition, computation, and reporting of one or more metrics for consumption by a software application 140. As shown in FIG. 1, the software application 140 may be a web-based application and/or a cloud-based application hosted at one or more data centers 145 including, for example, a first data center 145a, a second data center 145b, and/or the like. The one or more metrics services 115 may be event-driven in nature. That is, the one or more metrics services 115 may be configured to compute and update metrics based on events occurring at one or more event sources 150 including, for example, a first event source 150a, a second event source 150b, and/or the like. The one or more event sources 145 may include software systems and/or hardware systems such as the software application 140 deployed at the one or more data centers 145 and/or the computing infrastructure associated with the software application 140. Each event may therefore correspond to a change in a state of the software application 140 deployed at the one or more data centers 145 and/or the computing infrastructure associated with the software application 140.

In some example embodiments, the one or more metrics services 115 may support the definition of one or more rules identifying one or more events that trigger changes in the one or more metrics. Moreover, the one or more metrics service 115 may compute, upon each occurrence of the one or more events, a corresponding change in the value of the one or more metrics. In the example of the cloud computing system 100 shown in FIG. 1, the one or more metrics services 115 may detect, at one or more event sources 150, the occurrence of the one or more events. The changes in the value of the one or more metrics may be persisted, for example, in a database 160. The database 160 may be a relational database, a graph database, an in-memory database, a non-SQL (NoSQL) database, and/or the like. By persisting the changes in the value of the one or more metrics, the one or more metrics services 115 may enable the software application 140 consuming the one or more metrics to monitor the one or more metrics in real time. Although the software application 140 may still request the values of the one or more metrics from the metrics engine 110, the one or more rules may be further defined to include follow-up actions, which may be performed automatically by the one or more metrics services 115 when, for example, the changes in the value of the one or more metrics satisfy a threshold.

Figure 2A:
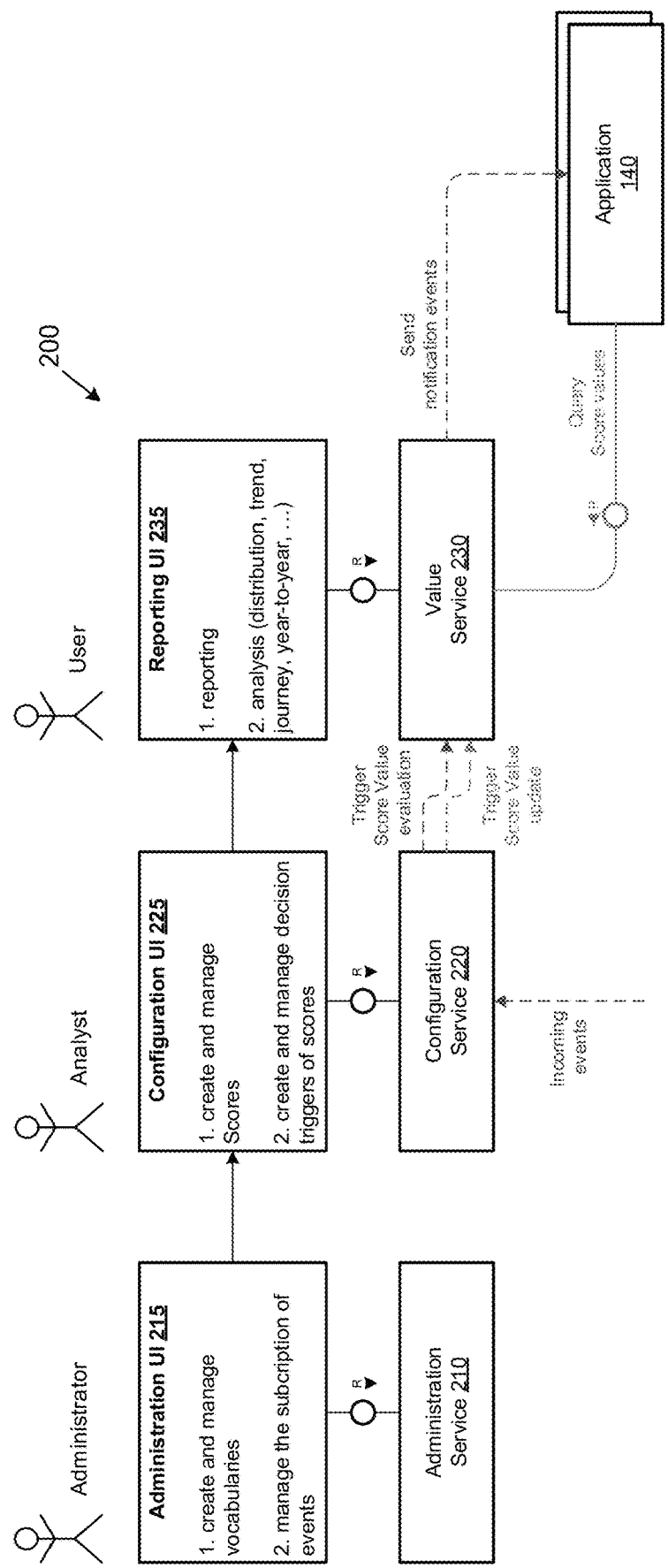
FIG. 2A depicts a schematic diagram illustrating an example of a process for an event-driven service for configurable metrics, in accordance with some example embodiments.

FIG. 2A depicts a schematic diagram illustrating an example of a process 200 for the one or more metrics services 115, in accordance with some example embodiments. Referring to FIGS. 1 and 2A, the one or more metrics services 115 may include an administration service 210, a configuration service 220, and a value service 230. In some example embodiments, the administration service 210 may be associated with an administration user interface 215 through which the vocabulary assigned to a metric may be defined. As used herein, the term "vocabulary" may refer to a set of events and attributes that may be selected to form the rules for updating the value of a metric. Meanwhile, the configuration service 220 may be associated with a configuration user interface 225 through which one or more metrics may be defined by configuring one or more corresponding rules based on the selection of events and attributes available in the vocabulary. For example, each rule may identify one or more events that trigger changes in the value of the one or more metrics.

Referring again to FIG. 2A, the configuration service 220 may apply the one or more rules to one or more incoming events to trigger, at the value service 220, an evaluation and/or an update of the value of the one or more metrics. For example, upon each occurrence of the one or more events identified in the one or more rules, the value service 230 may be triggered to may compute a corresponding change in the value of the one or more metrics and, in at least some instances, persist the changes as time series data in the database 160. A reporting user interface 235 associated with the value service 230 may be configured to generate one or more reports associated with the one or more metrics. For instance, the reporting user interface 235 may display a data presentation providing a visual representation of the changes in the value of the one or more metrics including, for example, a distribution, a trend, a journey, a year-to-year, and/or the like. Moreover, as shown in FIG. 2A, the one or more metrics may be made available to the software application 140 upon request from the software application 140 or by automatic notification events from the value service 230. It should be appreciated that one or more of the administration user interface 215, the configuration user interface 225, and the reporting user interface 235 may be displayed at a client device such as the client device 120.

Figure 2B:
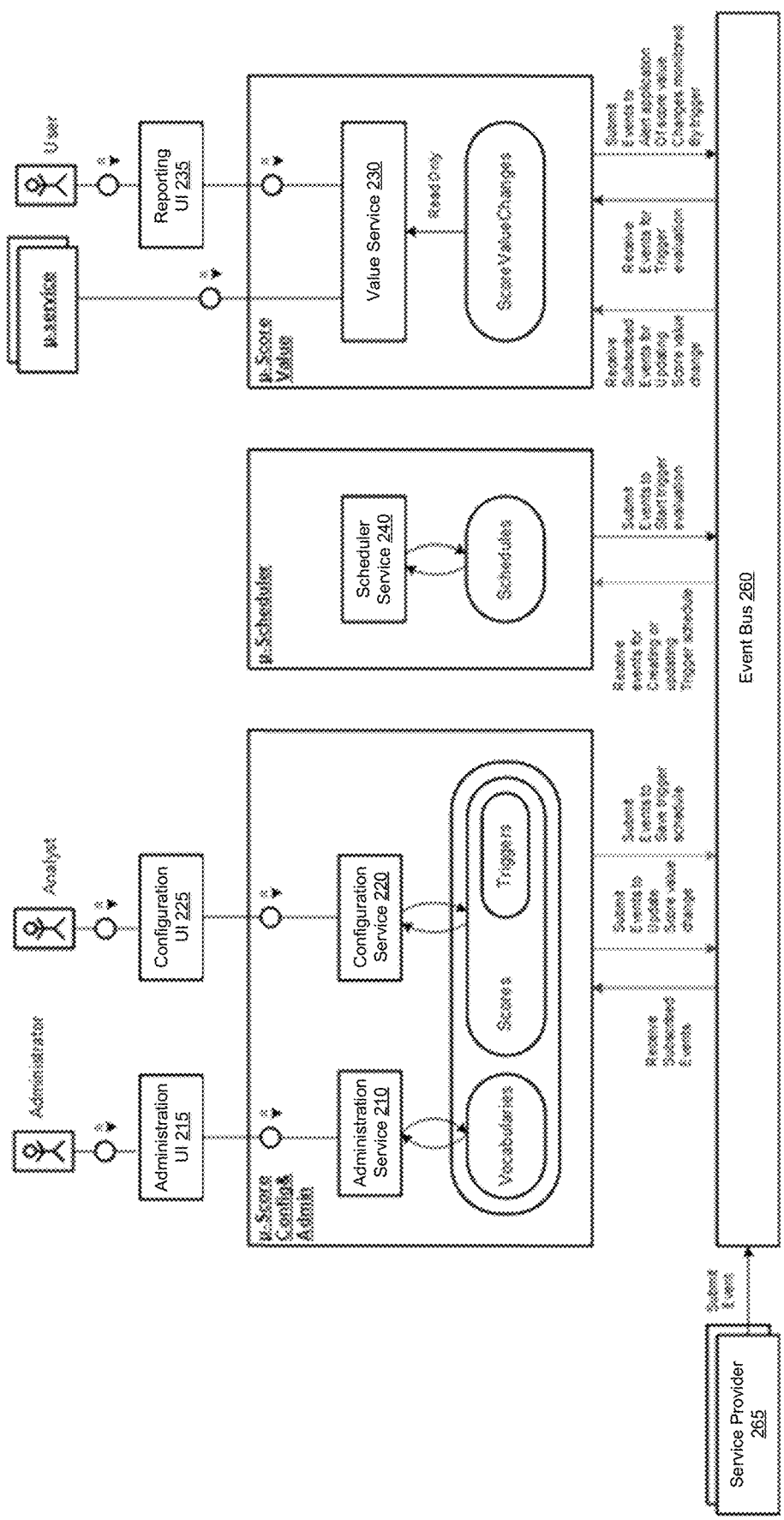
FIG. 2B depicts a block diagram illustrating an example of an architecture for an event-driven service for configurable metrics, in accordance with some example embodiments.

FIG. 2B depicts a block diagram illustrating an example of an architecture 250 for the one or more metrics services 115, in accordance with some example embodiments. As shown in FIG. 2B, the administration service 210, the configuration service 220, and the value service 230 may be available as microservices. Moreover, as shown in FIG. 2B, the administration service 210, the configuration service 220, and the value service 230 may receive, from an event bus 265, events submitted to the event bus 265 by one or more service providers 260. For example, the administration service 210, the configuration service 220, and the value service 230 may receive events from the event bus 265 on a subscription basis. Moreover, the administration service 210, the configuration service 220, and the value service 230 may also submit events to the event bus 265. For instance, the configuration service 220 may submit, to the event bus 265, events that cause the value service 230 to evaluate and/or update the value of a metric.

In the example of the architecture 250 shown in FIG. 2B, the one or more metrics services 115 may further include a scheduler service 240 configured to trigger the evaluation of a metric based one or more schedules. For example, FIG. 2B shows that the scheduler service 240 may receive, from the event bus 265, events to create and/or update a schedule. In turn, the scheduler service 240 may submit, based on the schedule, events that cause the value service 230 to evaluate a corresponding metric. As shown in FIG. 2B, upon evaluating and/or updating a metric, the value service 230 may submit, to the event bus 265, one or more events to alert the software application 140 of the changes in the metric.

Figure 3A:
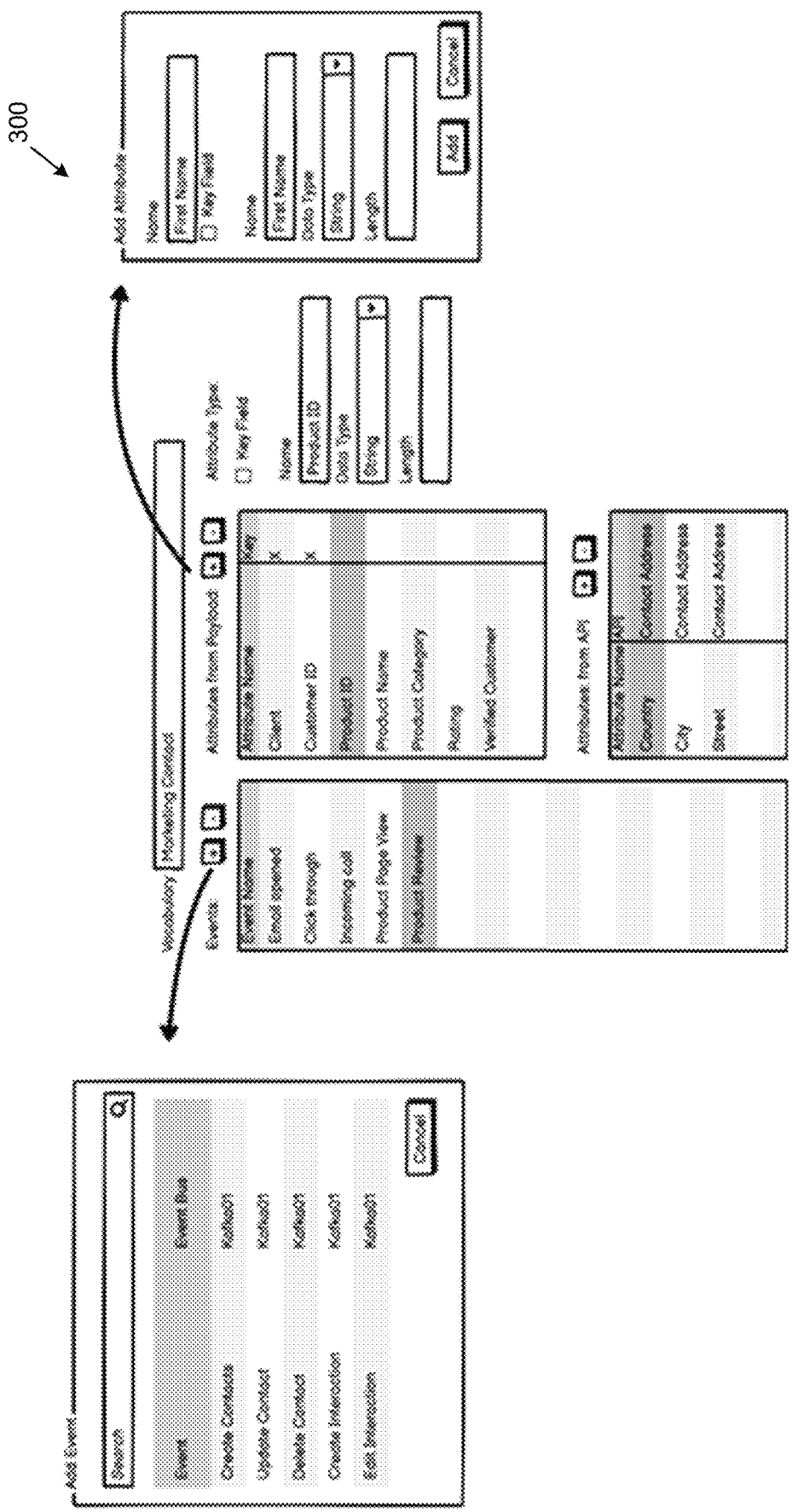
FIG. 3A depicts an example of a user interface for configuring a metric, in accordance with some example embodiments.

FIG. 3A depicts an example of a user interface 300 for configuring a metric, in accordance with some example embodiments. As shown in FIG. 3A, a metric may be defined based on a vocabulary (e.g., "marketing contact"), which may be associated with a software application (e.g., the software application 140) and a selection of events and attributes. As noted, the vocabulary itself, including the selection of available events and attributes, may be defined via the administration user interface 215 of the administration service 210. In the example of the user interface 300 shown in FIG. 3A, one or more events from the vocabulary (e.g., "marketing contact"), such as "create contact," "update contact," "delete contact," "create interaction," and "edit interaction," may be selected for addition to an event stream (e.g., the event bus 265). Referring back to FIG. 2B, doing so may generate a subscription to these events, such that one or more metrics services 115 may receive these events from the event bus 265.

Moreover, as shown in FIG. 3A, a metric may be defined by constructing one or more rules, each of which including an event selected from the vocabulary and one or more conditions for the corresponding attributes. As used herein, an "attribute" may refer to an attribute of a payload of the event. Some attributes, such as those containing the key of the vocabulary key object and the timestamp of the event, may be mandatory while other attributes, such as those containing datatypes and operators, may be optional. Alternatively and/or additionally, a rule may be defined to include a follow-up action and a threshold value in the change of a corresponding metric for triggering the follow-up action.

FIG. 3B depicts another example of a user interface 350 for configuring a metric, in accordance with some example embodiments. The example of the user interface 350 shown in FIG. 3B may include a selection of events for triggering the evaluation and/or update of a metric. Moreover, the example of the user interface 350 shown in FIG. 3B may include a selection of follow-up actions, which may be triggered based on the value (or changes in the value) of the metric. As shown in FIG. 3B, each follow-up action may be associated with a trigger corresponding to the value (or a change in the value) of a metric and a schedule for checking the trigger.

In some example embodiments, to create a new metric, the configuration service 220 may receive one or more user inputs specifying a vocabulary upon which the metric is defined. The one or more user inputs may also identify the one or more data objects for which the metric is defined. As noted, the vocabulary may include a selection of available events and attributes. As such, the rules associated with the metric may be defined to include the events and attributes present in the specified vocabulary. In some instances, the metric may be is defined based on a set of rules such that the value (or the change in the value) of the metric may be determined by evaluating each rule. Changes in the value of the metric may occur in different manner. For example, the value of the metric may change incrementally while the overall value of the metric may correspond to the sum of the increments. Alternatively and/or additionally, the value of the metric may be overwritten upon each change in the value of the metric. In this case, the overall value of the metric may correspond to the last change in the value of the metric.

Figure 4A:
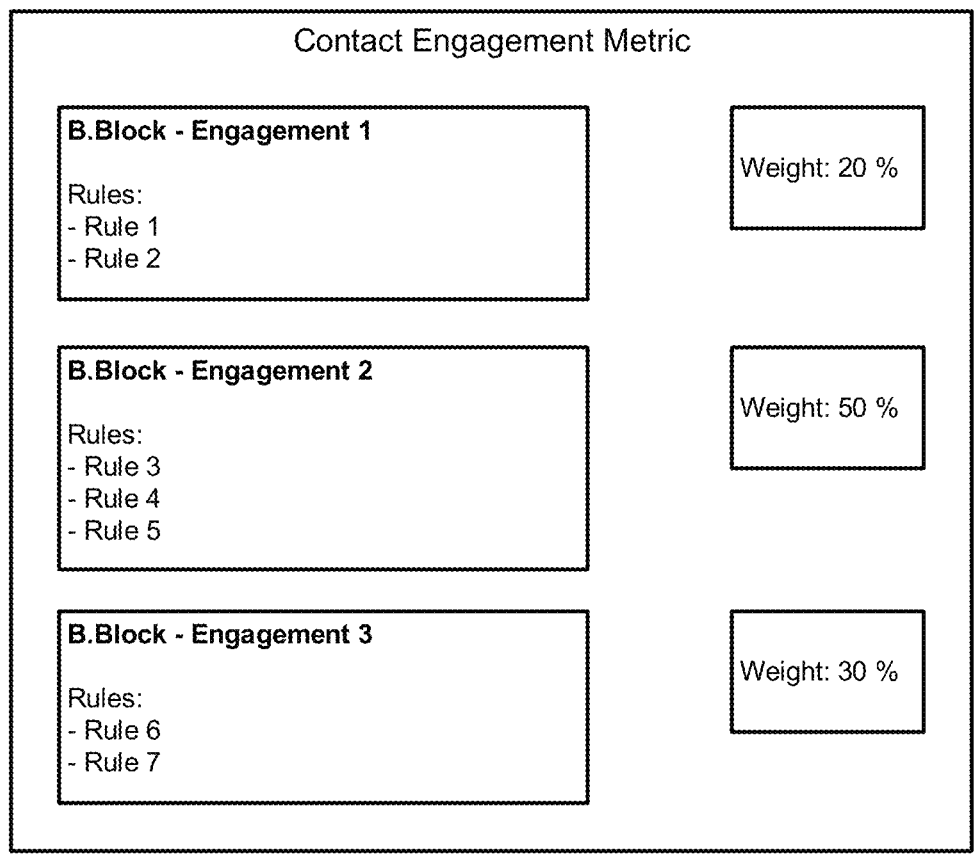
FIG. 4A depicts a schematic diagram illustrating an example of a definition for a metric, in accordance with some example embodiments.

In some example embodiments, a metric may be defined based on one or more building blocks, each of which containing one or more rules and associated with a weight. To further illustrate, FIG. 4A depicts a schematic diagram illustrating an example of a definition for the metric for contact engagement, in accordance with some example embodiments. As shown in FIG. 4A, the metric for contact engagement may be defined to include a first block Engagement 1 containing two rules, a second block Engagement 2 containing three rules, and a third block Engagement 3 containing two rules. Moreover, as shown in FIG. 4A, each block may be associated with a weight for computing the metric. Table 1 below depicts pseudo programming code corresponding to the definition for the metric for contact engagement.

TABLE 1

Metric Value("Contact Engagement Score") =
  weight(B.Block 1) * Metric Value(B.Block 1) +
  weight(B.Block 2) * Metric Value(B.Block 2) +
  weight(B.Block 3) * Metric Value(B.Block 3)

Figure 4B:
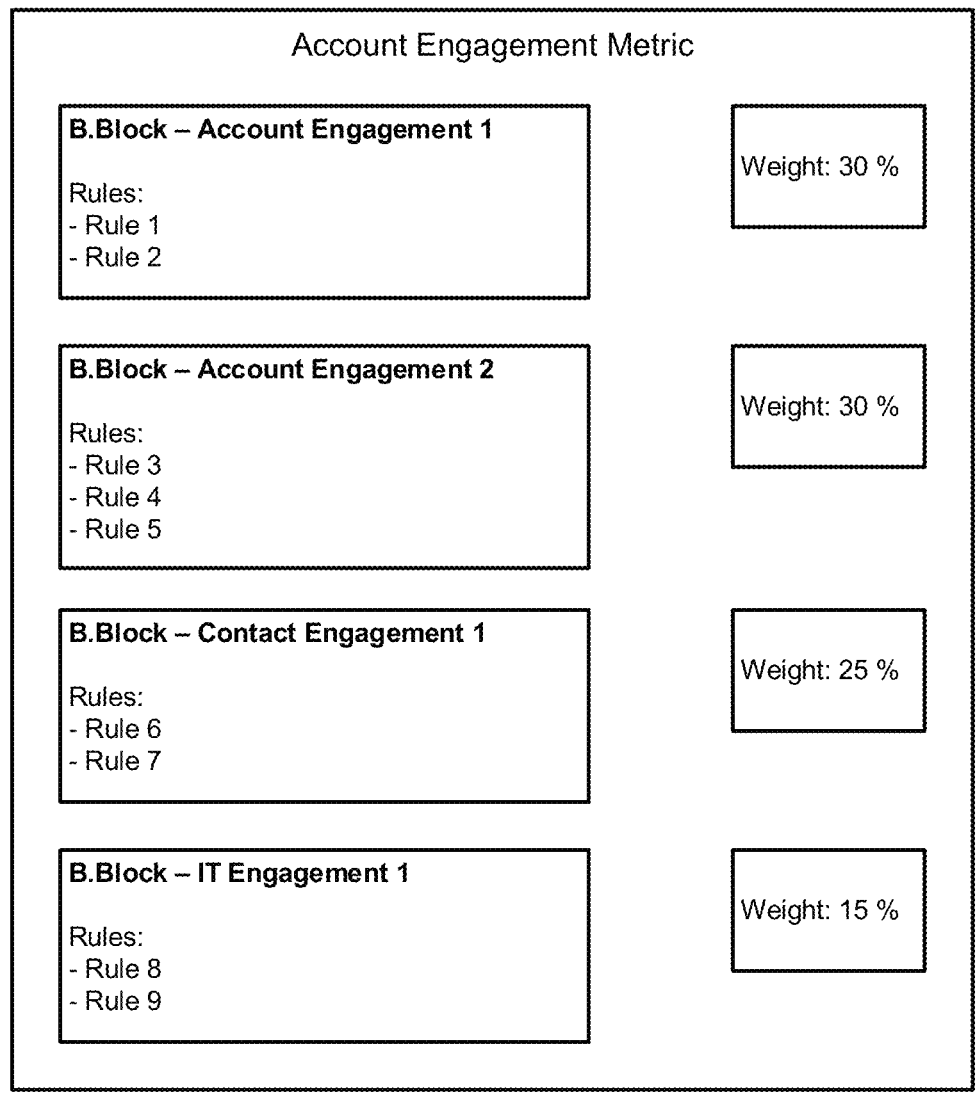
FIG. 4B depicts a schematic diagram illustrating another example of a definition for a metric, in accordance with some example embodiments.

FIG. 4B depicts a schematic diagram illustrating another example of a definition for the metric for account engagement, in accordance with some example embodiments. As shown in FIG. 4B, the metric for account engagement may be defined based on one or more building blocks. Moreover, the metric for account engagement may be a multi-level metric that includes, within its definition, the definition of other metrics such as metrics information technology engagement and contact engagement.

As noted, the value (or change in the value) of a metric may trigger one or more follow-up actions. For example, the configuration service 220 may support the configuration of a decision trigger, which may include one or more rules for how to evaluate the value of a metric and how to respond to the evaluation result. Different types of decision triggers may be configured including, for example, real time triggers, scheduled triggers, and scheduled to compare triggers. In some example embodiments, real time triggers may be configured for use cases where the software application 140 is required to monitor recent activities. Table 2 below depicts an example configuration for a real time trigger. The real time trigger, may be evaluated for each incoming event that could cause a change in the value of a metric, for example, by satisfying at least one rule in the definition of the metric. For instance, changes in the value of the metric are logged before the metric is evaluated by aggregating the changes over the evaluation timeframe before the time of the event timestamp. If the result of the evaluation satisfies a particular condition (e.g., the changes satisfy a threshold value), one or more action may be triggered (e.g., "alertSuperActiveContacts" even may be triggered with the corresponding contact keys).

As shown in Table 2, the configuration for a real time trigger may include an "action interval" (or an "action defer interval"), which may be configurable length of time that must transpire between successive performance of the same action before a change in a corresponding score value. The "action interval" setting may therefore be applicable in use cases where a user is expected to repeatedly perform the same action. For example, in the case of a website visit, the user may perform the action of visiting a website repeatedly by refreshing the website or navigating back and forth to the same website but not all such visits to the website should trigger a change in score value. By setting an "action interval" (or an "action defer interval"), the configuration service 220 may be configured to wait a threshold period of time between successive visits to the website before incrementing the score value.

TABLE 2

| Score ID | "Contact Engagement Score" |
|---|---|
| Trigger Name | super-active contacts |
| Trigger Type | Real-Time |
| Evaluation Timeframe | 6 hours |
| Evaluation Frequency | |
| Evaluation Condition | ScoreVaule >=50 |
| Action Type | Send-Event |
| Action | "alertSuperActiveContact" |
| ActionInterval | 600 s |

Scheduled triggers may be configured for use cases where the value of the metric itself requires regular monitoring. Scheduled triggers may be associated with, for example, the scheduler service 240 shown in FIG. 2B, which triggers the evaluation of the metric based on a corresponding schedule. Table 3 below depicts an example configuration for a scheduled trigger. In some example embodiments, for a scheduled trigger, the scheduler service 240 may be configured to trigger the evaluation of a metric periodically. For example, the value of the metric may be evaluated by aggregating changes in the value of the metric over the evaluation timeframe before the time of evaluation (e.g., current time). One or more actions may be triggered if the value of the metric satisfy a certain condition (e.g., satisfies a threshold value).

TABLE 3

| Score ID | "Contact Engagement Score" |
|---|---|
| Trigger Name | engaged contacts |
| Trigger Type | Scheduled |
| Evaluation Timeframe | 60 days |
| Evaluation Frequency | Weekly |
| Evaluation Condition | ScoreVaule >=150 |
| Action Type | Send-Event |
| Action | "alertEngagedContact" |

A scheduled to compare trigger may be configured for use cases that require monitoring changes in the value of a metric in a current time period relative to a previous time period. Table 4 below depicts an example configuration for a scheduled to compare trigger.

TABLE 4

| Score ID | "Contact Engagement Score" |
|---|---|
| Trigger Name | Turned inactive contacts |
| Trigger Type | Scheduled compare |
| Evaluation Timeframe | 30 days |
| Evaluation Frequency | |

TABLE 4-continued

| Score ID | "Contact Engagement Score" |
|---|---|
| Evaluation Condition | Difference(ScoreVaule) <= −20 |
| Action Type | Send-Event |
| Action | "alertTurnedInactiveContact" |

In some example embodiments, the scheduler service 240 may be configured to trigger the evaluation of the metric periodically. The evaluation of the metric may include evaluating the value of the metric for a first time period by aggregating changes in the value of the metric over the evaluation timeframe before the time of evaluation (e.g., current time). Moreover, the evaluation of the metric may include evaluating the value of the metric for a second time period by aggregating changes in the value of the metric over the evaluation timeframe before the current time period (e.g., current time—evaluation timeframe). One or more actions may be triggered based on the difference between a first value of the metric for the first time period and a second value of the metric for the second time period. For example, if the difference between the first value of the metric for the first time period and the second value of the metric for the second time period satisfy a certain condition (e.g., a threshold value), one or more corresponding actions may be triggered (e.g., "alertSuperActiveContacts" even may be triggered with the corresponding contact keys).

Figure 5A:
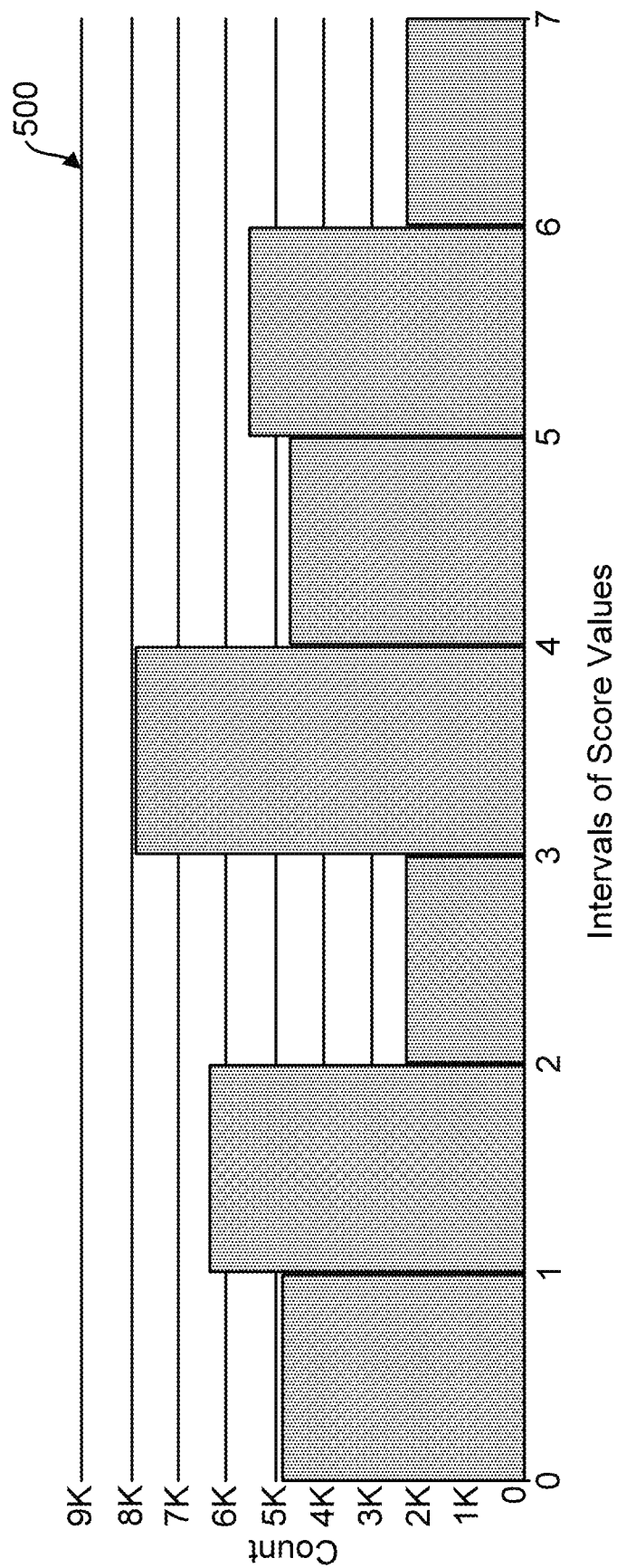
FIG. 5A depicts an example of a data presentation providing a visual representation of an event-driven configurable metric, in accordance with some example embodiments.
Figure 5B:
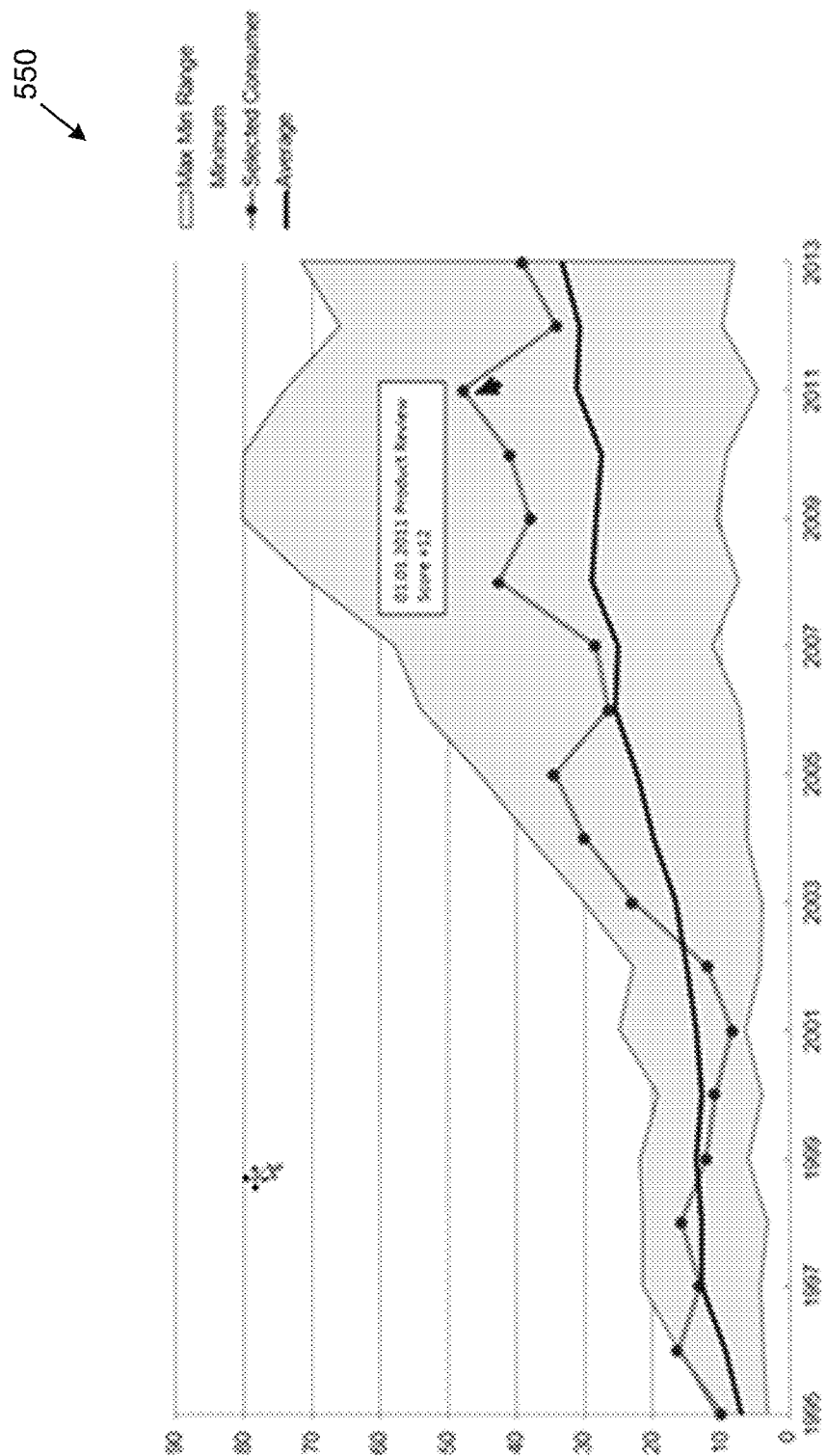
FIG. 5B depicts another example of a data presentation providing a visual representation of an event-driven configurable metric, in accordance with some example embodiments.

In some example embodiments, the value service 230 may be configured to generate a data presentation providing a visual representation of the value (or changes in the value) of the metric. FIG. 5A depicts one example of a data presentation 500 providing a visual representation of an event-driven configurable metric and FIG. 5B depicts another example of a data presentation 550 providing a visual representation of an event-driven configurable metric, in accordance with some example embodiments. The example of the data presentation 500 shown in FIG. 5A may be a histogram depicting the distribution of the value of a metric between multiple customers. The example of the data presentation 550 shown in FIG. 5B may depict time-series data associated with one or more customers. In doing so, the data presentation 550 may provide a visual representation of the trend that is present in the value of the metric (e.g., minimum, maximum, range, average, and/or the like) associated with one or more customers. Selecting a single data point in the data presentation 550 may trigger an update in the data presentation 550 that includes the display of the one or more events associated with the change in the value of the metric.

Figure 6:
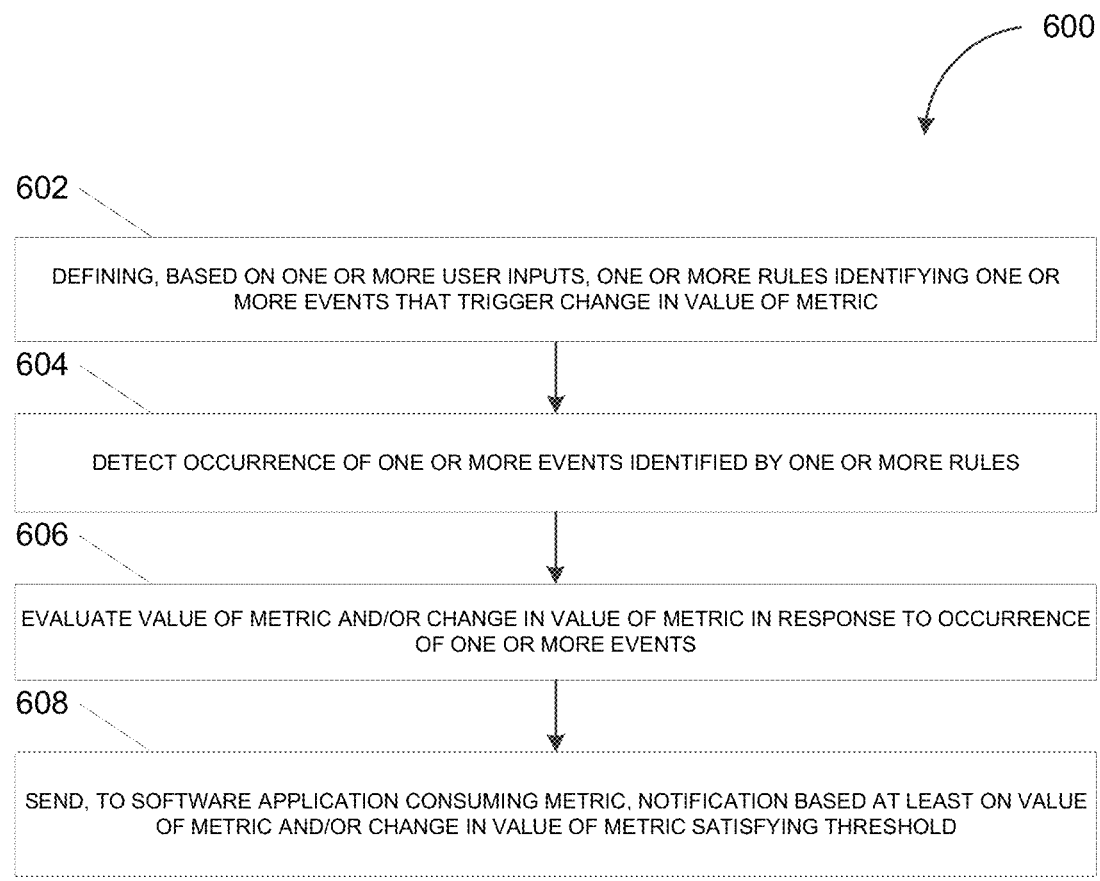
FIG. 6 depicts a flowchart illustrating an example of a process for an event-driven service for configurable metrics, in accordance with some example embodiments.

FIG. 6 depicts a flowchart illustrating an example of a process 600 for event-driven service for configurable metrics, in accordance with some example embodiments. Referring to FIGS. 1-6, the process 600 may be performed by the metrics controller 110, for example, the one or more metrics services 115, to determine the value of a configurable metric for consumption by the software application 140.

At 602, the metrics controller 110 may define, based at least on one or more user inputs, one or more rules identifying one or more events that trigger a change in a value of a metric. In some example embodiments, the one or more metrics services 115 of the metrics controller 110 may include the configuration service 220. The configuration user interface 225 associated with the configuration service 220 may be displayed, for example, at the client device 120, to enable the definition of one or more rules for evaluating and/or updating the value of a metric. As shown in FIG. 3A, the definition of the metric may include selecting a vocabulary, which may include the set of events and attributes available for defining the metric. Moreover, as shown in FIGS. 4A-B, the metric may be defined based on one or more building blocks, each of which containing one or more rules and associated with a weight.

At 604, the metrics controller 110 may detect the occurrence of the one or more events identified by the one or more rules. In some example embodiments, the one or more events included in a rule may be added to an event stream (e.g., the event bus 265). In doing so, upon the occurrence of an event, such as "create contact," "update contact," "delete contact," "create interaction," and "edit interaction," the value service 230 included in the one or more metrics services 115 of the metrics controller 110 may receive the event from the event bus 265.

At 606, the metrics controller 110 may evaluate the value of the metric and/or the change in the value of the metric in response to the occurrence of the one or more events. For example, upon receiving an event from the event bus 265, the value service 230 may evaluate, based on the event, the value of the metric and/or a change in the value of the metric. In the case the metric is associated with a real time trigger, the value service 230 may evaluate the value of the metric and/or the change in the value of the metric for each incoming event that may cause a change in the value of the metric. Alternatively, for a scheduled trigger, the value service 230 may evaluate the value of the metric and/or the change in the value of the metric based on a particular schedule. For instance, FIG. 3B shows that the scheduler service 240 may insert, based on the schedule, events into the event bus 260 to trigger the evaluation of the metric at the value service 230. In the event the metric is associated with scheduled to compare trigger, the evaluation of the metric may be performed for different periods of time.

At 608, the metrics controller 110 may send, to a software application consuming the metric, a notification based at least on the value of the metric and/or the change in the value of the metric satisfying a threshold. In some example embodiments, the rule associated with a metric may be defined to include one or more follow-up actions, which may be performed automatically when, for example, the value of the metric and/or the changes in the value of the metric satisfy a threshold. For example, as shown in FIGS. 2A-B, the value service 230 may determine whether the value of the metric and/or the change in the value of the metric satisfy a threshold. When the value of the metric and/or the change in the value of the metric satisfy the threshold, the value service 230 may send, to the software application 140 consuming the metric, one or more corresponding notification events.

In some example embodiments, the value of the metric and/or the change in the value of the metric may be applied toward a variety of use cases. For example, the metric and/or the change in the value of the metric may correspond to sensor data (e.g., events) from one or more Internet-of-Things (IoT) appliances, in which case the metric and/or the change in the value of the metric may be defined to monitor and/or evaluate the state of the entities associated with the one or more Internet-of-Things (IoT) appliances. Alternatively, the metfic and/or the changes in the value of the metric may be defined to monitor the user actions such as web clicks during website visit, posts on social media, reviews for product or service, purchases of products or services, attendances at events, and/or the like. In some cases, the metric and/or the changes in the value of the metric may also be defined to be defined to monitor and evaluate the status of a production process including to detect and identify abnormalities that arise along the production line.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: defining, based at least on one or more user inputs, a first rule identifying a first event that triggers a change in a value of a first metric, the defining of the first rule includes generating a first subscription to receive the first event from an event stream; detecting, based at least on receiving the first event from the event stream, an occurrence of the first event identified by the first rule; in response to the occurrence of the first event, evaluating the value of the first metric and/or the change in the value of the first metric; and sending, to a software application consuming the first metric, a notification based at least on the value of the first metric and/or the change in the value of the first metric satisfying a threshold.

Example 2: The system of example 1, wherein the operations further comprise: defining, based at least on the one or more user inputs, a second rule identifying a second event that triggers the change in the value of the first metric, the defining of the second rule includes generating a second subscription to receive the second event from the event stream; detecting, based at least on receiving the second event from the event stream, an occurrence of the second event identified by the second rule; and in response to the occurrence of the second event, evaluating the value of the first metric and/or the change in the value of the first metric.

Example 3: The system of any one of examples 1 to 2, wherein the one or more user inputs specify a vocabulary associated with the software application consuming the first metric, wherein the vocabulary includes a selection of events, and wherein the one or more user inputs further select the first event from the selection of events.

Example 4: The system of example 3, wherein the vocabulary further includes a selection of attributes associated with a payload of the first event, wherein the one or more user inputs further select an attribute associated with the payload of the first event, and wherein the first rule imposes one or more conditions upon the selected attribute.

Example 5: The system of any one of examples 1 to 4, wherein the first rule is defined based on a first building block including the first rule and a second building block including a second rule, wherein the first building block is associated with a first weight and the second building block is associated with a second weight, and wherein the first metric is evaluated based at least on the first weight applied to a first value of the first building block and the second weight applied to a second value of the second building block.

Example 6: The system of example 5, wherein at least one of the first building block and the second building block is associated with a second metric.

Example 7: The system of any one of examples 1 to 6, wherein the evaluating of the value of the first metric and/or the change in the value of the first metric is triggered based on a schedule.

Example 8: The system of example 7, wherein the schedule includes real time triggers or periodic triggers for evaluating the value of the first metric and/or the change in the value of the first metric.

Example 9: The system of any one of examples 1 to 8, wherein the evaluating of the first metric includes aggregating a first plurality of changes in the value of the first metric over a first time period and aggregating a second plurality of changes in the value of the first metric over a second time period, and wherein the evaluating of the first metric further includes determining whether a difference between the first plurality of changes and the second plurality of changes satisfy a condition.

Example 10: The system of any one of examples 1 to 9, wherein the operations further comprise: storing the value of the first metric and/or the change in the value of the first metric as time-series data in a database.

Example 11: The system of any one of examples 1 to 10, wherein the operations further comprise: generating, for display at a client device, a data presentation providing a visual representation of the value of the first metric and/or the change in the value of the first metric.

Example 12: The system of any one of examples 1 to 11, wherein the software application comprises an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

Example 13: A computer-implemented method, comprising: defining, based at least on one or more user inputs, a first rule identifying a first event that triggers a change in a value of a first metric, the defining of the first rule includes generating a first subscription to receive the first event from an event stream; detecting, based at least on receiving the first event from the event stream, an occurrence of the first event identified by the first rule; in response to the occurrence of the first event, evaluating the value of the first metric and/or the change in the value of the first metric; and sending, to a software application consuming the first metric, a notification based at least on the value of the first metric and/or the change in the value of the first metric satisfying a threshold.

Example 14: The method of example 13, wherein the operations further comprise: defining, based at least on the one or more user inputs, a second rule identifying a second event that triggers the change in the value of the first metric, the defining of the second rule includes generating a second subscription to receive the second event from the event stream; detecting, based at least on receiving the second event from the event stream, an occurrence of the second event identified by the second rule; and in response to the occurrence of the second event, evaluating the value of the first metric and/or the change in the value of the first metric.

Example 15: The method of any one of examples 13 to 14, wherein the one or more user inputs specify a vocabulary associated with the software application consuming the first metric, wherein the vocabulary includes a selection of events, wherein the one or more user inputs further select the first event from the selection of events, wherein the vocabulary further includes a selection of attributes associated with a payload of the first event, wherein the one or more user inputs further select an attribute associated with the payload of the first event, and wherein the first rule imposes one or more conditions upon the selected attribute.

Example 16: The method of any one of examples 13 to 15, wherein the first rule is defined based on a first building block including the first rule and a second building block including a second rule, wherein the first building block is associated with a first weight and the second building block is associated with a second weight, and wherein the first metric is evaluated based at least on the first weight applied to a first value of the first building block and the second weight applied to a second value of the second building block.

Example 17: The method of any one of examples 13 to 16, wherein the evaluating of the value of the first metric and/or the change in the value of the first metric is triggered based on a schedule, and wherein the schedule includes real time triggers or periodic triggers for evaluating the value of the first metric and/or the change in the value of the first metric.

Example 18: The method of any one of examples 13 to 17, wherein the evaluating of the first metric includes aggregating a first plurality of changes in the value of the first metric over a first time period and aggregating a second plurality of changes in the value of the first metric over a second time period, and wherein the evaluating of the first metric further includes determining whether a difference between the first plurality of changes and the second plurality of changes satisfy a condition.

Example 19: The method of any one of examples 1 to 18, further comprising: generating, for display at a client device, a data presentation providing a visual representation of the value of the first metric and/or the change in the value of the first metric.

Example 20: A non-transitory computer readable medium storing instructions, which when executed by at least one data processor, result in operations comprising: defining, based at least on one or more user inputs, a first rule identifying a first event that triggers a change in a value of a first metric, the defining of the first rule includes generating a first subscription to receive the first event from an event stream; detecting, based at least on receiving the first event from the event stream, an occurrence of the first event identified by the first rule; in response to the occurrence of the first event, evaluating the value of the first metric and/or the change in the value of the first metric; and sending, to a software application consuming the first metric, a notification based at least on the value of the first metric and/or the change in the value of the first metric satisfying a threshold.

Figure 7:
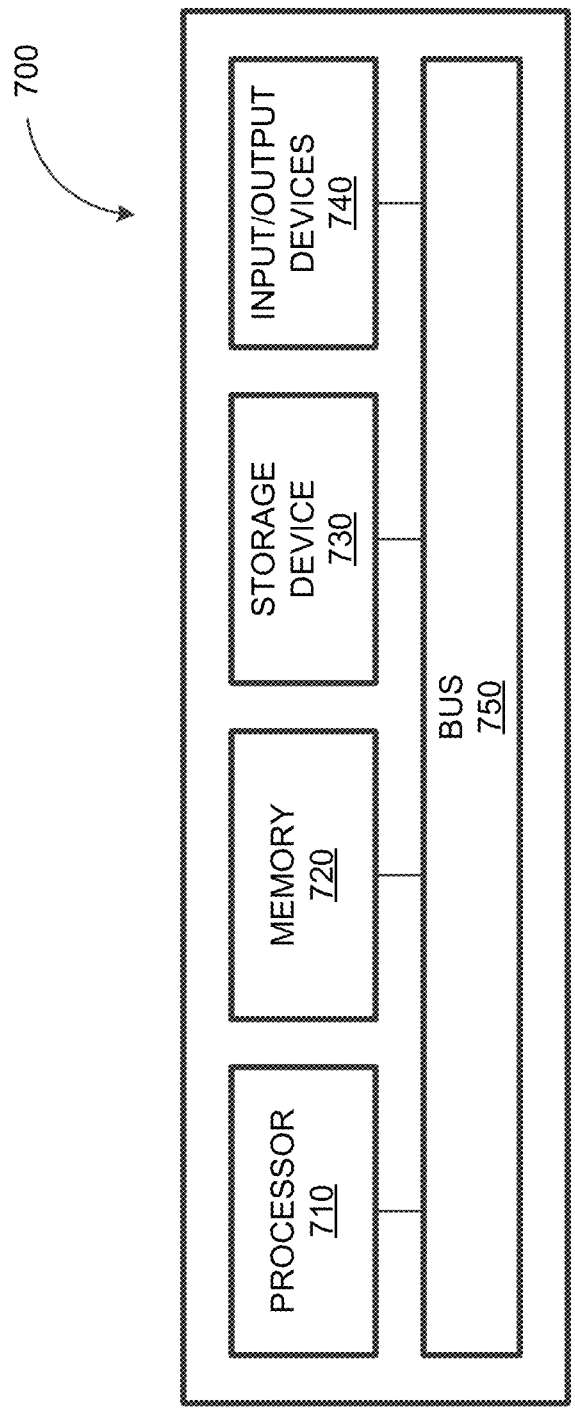
FIG. 7 depicts a block diagram illustrating an example of a computing system, in accordance with some example embodiments; and When practical, similar reference numbers denote similar structures, features, or elements.

FIG. 7 depicts a block diagram illustrating a computing system 700, in accordance with some example embodiments. Referring to FIGS. 1-7, the computing system 700 can be used to implement the replication controller 110 and/or any components therein.

As shown in FIG. 7, the computing system 700 can include a processor 710, a memory 720, a storage device 730, and an input/output device 740. The processor 710, the memory 720, the storage device 730, and the input/output device 740 can be interconnected via a system bus 750. The processor 710 is capable of processing instructions for execution within the computing system 700. Such executed instructions can implement one or more components of, for example, the replication controller 110. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
      defining a first rule identifying a first event that triggers a change in a value of a first metric;
      detecting, based at least on receiving the first event, an occurrence of the first event identified by the first rule;
      in response to the occurrence of the first event, evaluating the value of the first metric to detect the change in the value of the first metric; and
      sending, to a software application consuming the first metric, a notification regarding the change in the value of the first metric satisfying a threshold.

2. The system of claim 1, wherein the first rule is defined based on one or more user inputs.

3. The system of claim 2, wherein the one or more user inputs specify a vocabulary associated with the software application consuming the first metric.

4. The system of claim 3, wherein the vocabulary includes a selection of events, and wherein the one or more user inputs further select the first event from the selection of events.

5. The system of claim 1, wherein the defining of the first rule further comprises generating a first subscription to receive the first event from an event stream.

6. The system of claim 1, wherein the operations further comprise:
   defining a second rule identifying a second event that triggers the change in the value of the first metric.

7. The system of claim 6, wherein the operations further comprise:
   detecting, based at least on receiving the second event, an occurrence of the second event identified by the second rule.

8. The system of claim 7, wherein the operations further comprise:
   in response to the occurrence of the second event, evaluating the value of the first metric including the change in the value of the first metric.

9. The system of claim 1, wherein the evaluating of the value of the first metric is triggered based on a schedule, and wherein the schedule includes triggers for evaluating the value of the first metric.

10. The system of claim 1, wherein the operations further comprise:
    storing the value of the first metric as time-series data in a database.

11. The system of claim 1, wherein the operations further comprise:
    generating, for display at a client device, a data presentation providing a visual representation of the value of the first metric.

12. A computer-implemented method, comprising:
    defining a first rule identifying a first event that triggers a change in a value of a first metric;
    detecting, based at least on receiving the first event, an occurrence of the first event identified by the first rule;
    in response to the occurrence of the first event, evaluating the value of the first metric including the change in the value of the first metric; and
    sending, to a software application consuming the first metric, a notification regarding the change in the value of the first metric satisfying a threshold.

13. The computer-implemented method of claim 12, wherein the first rule is defined based on one or more user inputs.

14. The computer-implemented method of claim 13, wherein the one or more user inputs specify a vocabulary associated with the software application consuming the first metric.

15. The computer-implemented method of claim 14, wherein the vocabulary includes a selection of events, and wherein the one or more user inputs further select the first event from the selection of events.

16. The computer-implemented method of claim 12, wherein the defining of the first rule further comprises generating a first subscription to receive the first event from an event stream.

17. The computer-implemented method of claim 12, further comprising:
defining a second rule identifying a second event that triggers the change in the value of the first metric.

18. The computer-implemented method of claim 17, further comprising:
detecting, based at least on receiving the second event, an occurrence of the second event identified by the second rule.

19. The computer-implemented method of claim 18, further comprising:
in response to the occurrence of the second event, evaluating the value of the first metric including the change in the value of the first metric.

20. A non-transitory computer readable medium storing instructions, which when executed by at least one data processor, result in operations comprising:
defining a first rule identifying a first event that triggers a change in a value of a first metric;
detecting, based at least on receiving the first event, an occurrence of the first event identified by the first rule;
in response to the occurrence of the first event, evaluating the value of the first metric including the change in the value of the first metric; and
sending, to a software application consuming the first metric, a notification regarding the change in the value of the first metric satisfying a threshold.

\* \* \* \* \*